Oct. 20, 1931.   C. G. KELLER   1,827,790
VEHICLE WHEEL
Filed Dec. 11, 1926    7 Sheets-Sheet 1

Inventor
Charles G. Keller
By his Attorneys

Oct. 20, 1931.   C. G. KELLER   1,827,790
VEHICLE WHEEL
Filed Dec. 11, 1926   7 Sheets-Sheet 2

Oct. 20, 1931.  C. G. KELLER  1,827,790
VEHICLE WHEEL
Filed Dec. 11, 1926   7 Sheets-Sheet 4

Oct. 20, 1931.     C. G. KELLER     1,827,790
VEHICLE WHEEL
Filed Dec. 11, 1926     7 Sheets-Sheet 5

Patented Oct. 20, 1931

1,827,790

UNITED STATES PATENT OFFICE

CHARLES G. KELLER, OF POUGHKEEPSIE, NEW YORK

VEHICLE WHEEL

Application filed December 11, 1926. Serial No. 154,092.

My invention relates particularly to a type of a construction in which the tire carrying rim is detachably secured directly to the spoke ends and the usual felly is omitted.

As one important feature of my improved construction the hub, spokes and brake drum are formed in a single integral casting.

As the felly is omitted, the weight is reduced but greater strength is secured as the brake drum is integral with the spokes near their outer ends. The brake drum is spaced from the extremities of the spokes so that the transfer of heat from the brake drum to the tire is reduced to the minimum although the drum is of large size in comparison to the wheel. The spokes are so designed that an air current may flow between the drum and rim to further retard transfer of heat to the rim.

As a further important feature the parts are so designed that the hub, spokes, and brake drum may be cast in a two-part green sand mold without the use of cores so that great accuracy in casting is secured, the minimum of machine work is required and the complete wheel is produced at very low cost.

Among the advantages provided by my improved construction are, reduced cost of foundry, machine shop and assembly work; greater machinery accuracy of the brake drum, due to the fact that the drum and hub may be machined at a single setting, insuring concentricity of the drum and hub; more rigid construction; reduction of weight over previous construction, with a resultant reduction of unsprung weight less tire wear and better riding qualities in a vehicle employing my improved wheel; better dissipation of heat from the brake drum and less heat transmitted to the tires; and greater safety by elimination of possibility that the brake drum might work loose, due to faulty workmanship in assembly or to thermal expansion and contraction.

Furthermore there is less distortion and expansion of the brake drum under severe brake action and therefore simpler brake rigging may be employed and operate through a smaller range of movement, such as the brake pedal movement operating the brake shoes. It affords an open construction for the circulation of air and permits the use of air baffles which may be applied or removed without removing the rims.

A further object of the invention is to facilitate the cooling of the brake drum by circulating air over the inner and outer surfaces thereof. The brake drum is disposed within and adjacent to but spaced from one of the rims, and the wheel is so constructed that during rotation air currents are generated by the fan action of the wheel. One set of currents enters between the spokes at the outboard side of the wheel and flows in an axial direction along the outer side of the brake drum, while other air currents enter the spokes at the inboard side and flow outward radially through the spokes and out between the two rims.

A further object is to provide a simple form of clamping bolt which serves to separately hold in place and independently clamp the two rims of a twin tire wheel and at the same time to accurately space said rims. No claim is made herein to such clamping and spacing means, these features being claimed in my copending application Serial No. 182,199, filed April 9th, 1927, and divisional application Serial No. 562,863 filed September 15, 1931.

Another object of my invention is to provide a simple construction of wheel adapted to carry tire rims of different standard makes.

Another object is to so design the wheel that different clamping members may be employed in accordance with the particular type of rim which is employed.

Another object is to provide means whereby the wheel may be mounted on axles of different sizes or of different makes by the use of a suitable adapter.

In the accompanying drawings I have illustrated certain embodiments of my invention but these are to be considered in an illustrative rather than in a limiting sense.

Figure 1:
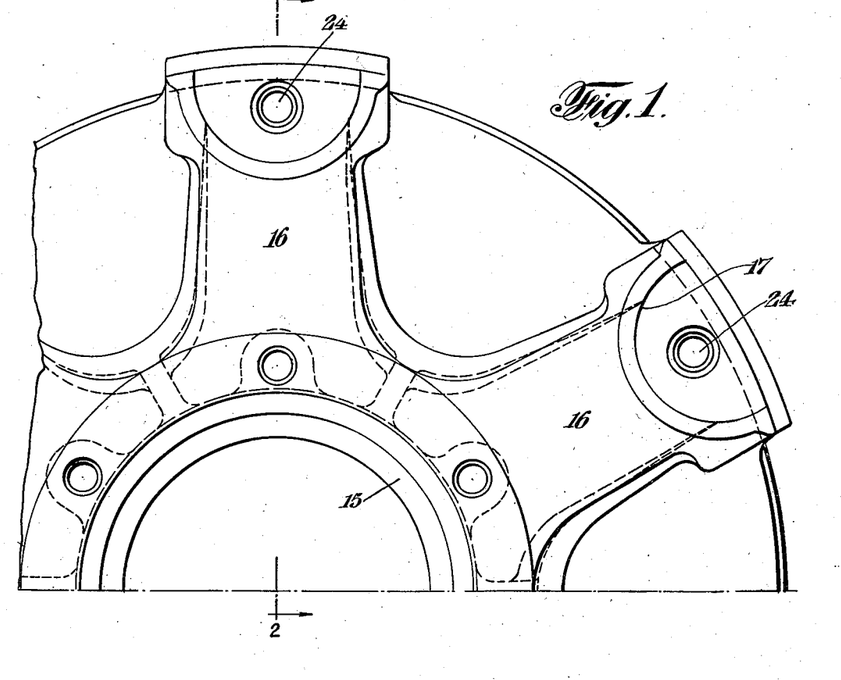
Fig. 1 is an end view of a portion of the casting or body part of one form of my improved wheel.
Figure 2:
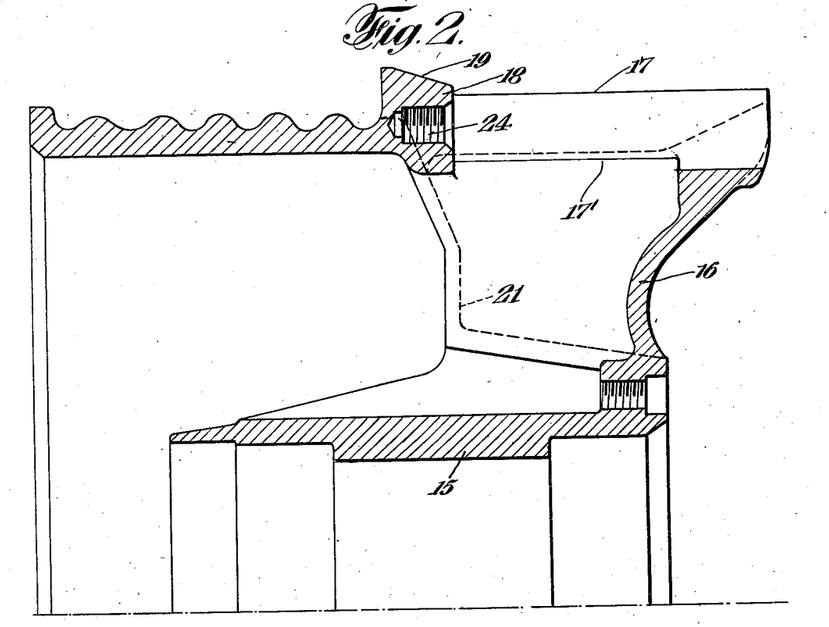
Fig. 2 is a section on line 2—2 of Fig. 1.
Figure 3:
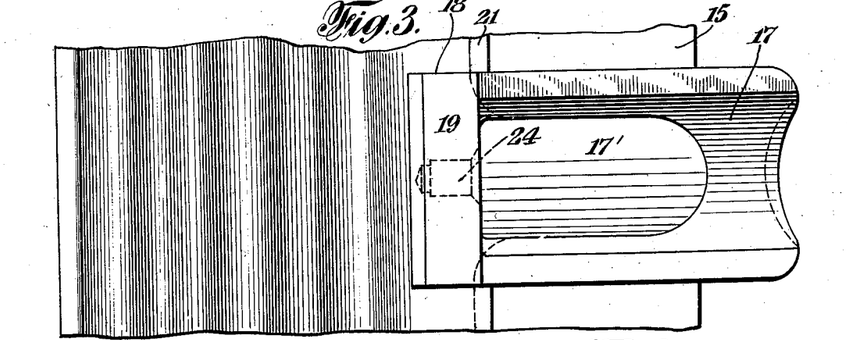
Fig. 3 is an edge view of a portion of the wheel showing the end of a spoke.
Figures 4, 12, 13:
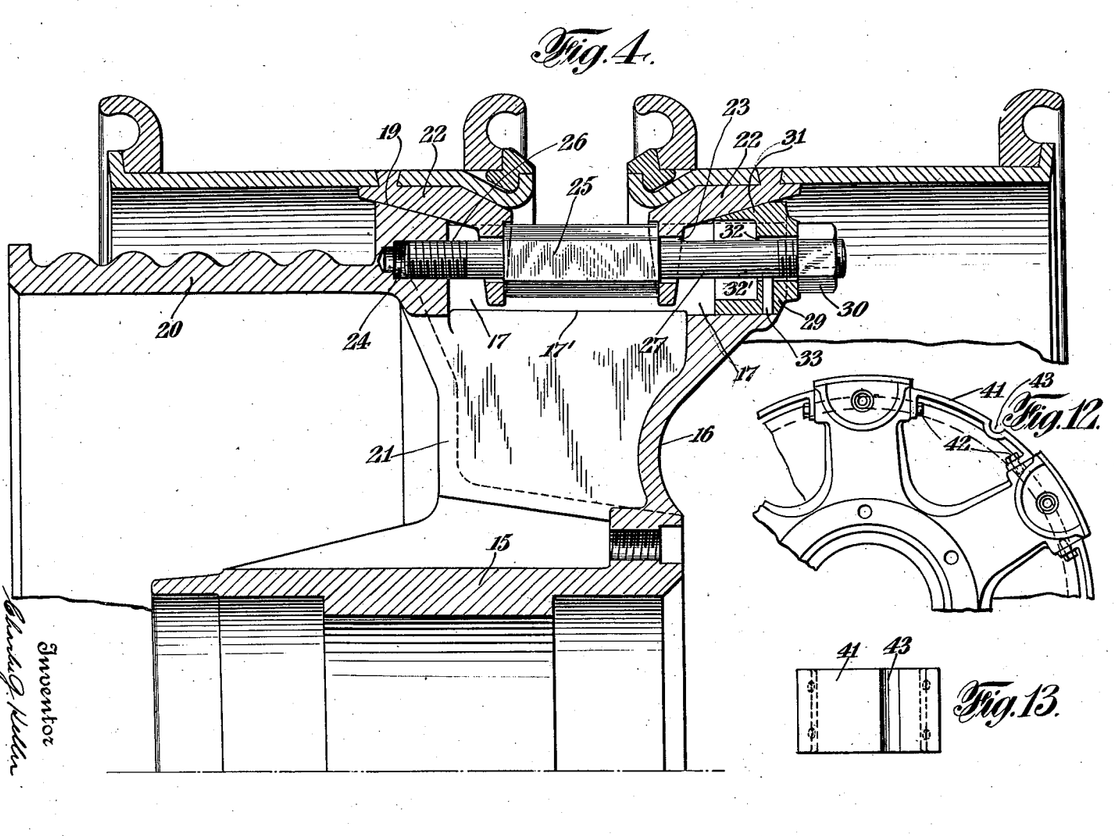
Fig. 4 is a view similar to Fig. 2 but showing a pair of tire rims mounted thereon.
Fig. 12 is an end view of a portion of my improved wheel on a smaller scale showing air deflecting shields or baffles mounted between adjacent spokes.
Fig. 13 is a plan view of one of the shields shown in Fig. 12.
Figures 9, 10, 11:
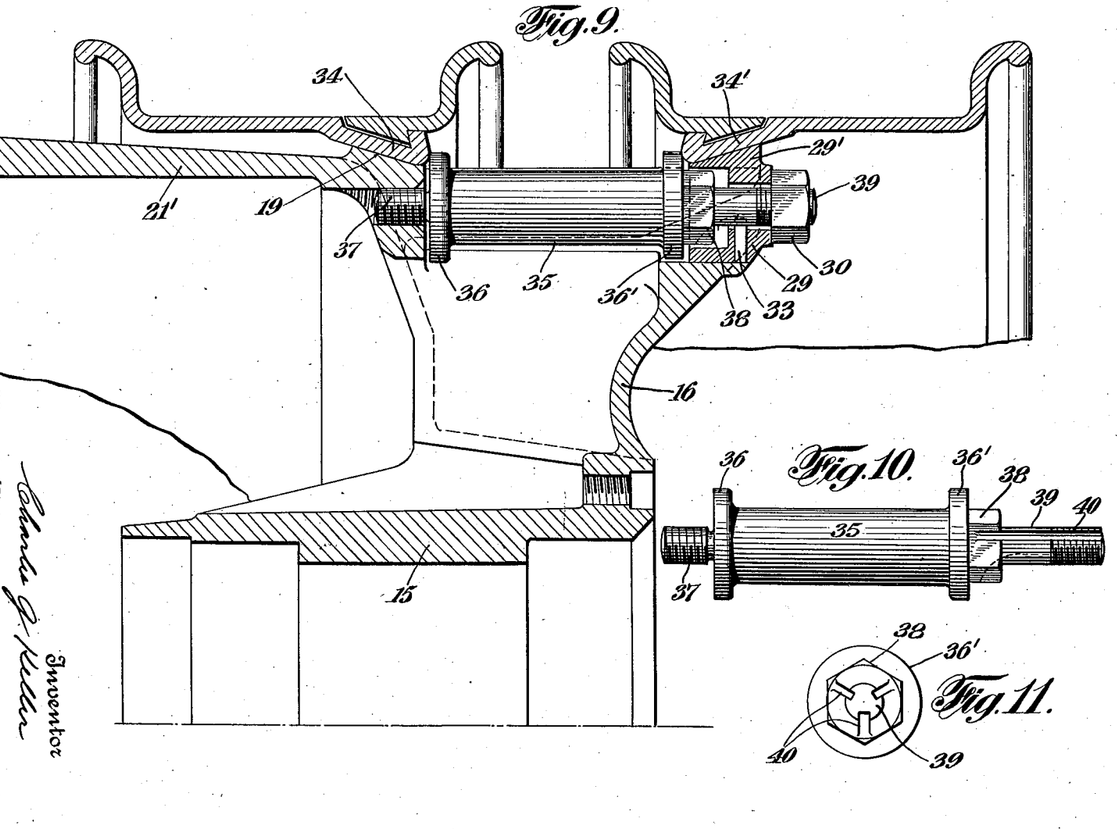
Fig. 9 is a section similar to Fig. 4 but showing a pair of tire rims of another type and also showing certain slight modifications of details of the wheel.
Figs. 10 and 11 are side and end views respectively of the fastening bolt shown in Fig. 9.

The body portion of the wheel shown in Figs. 4 and 9 is separately illustrated in Figs. 1, 2 and 3. It is of the fellyless spider form, comprising a hub, a plurality of spokes and a brake drum, all forming a single integral casting. The hub 15 may be of any suitable shape and proportions adapted to be secured upon a vehicle axle. The spokes 16 are preferably of U-shape in cross section, and are connected by a web 21. The brake drum 20 is integral with the outer edge of the web and joins the spokes at points spaced inwardly a very short distance from the spoke extremities. In some constructions the web may be omitted, if not desired.

Figure 15:
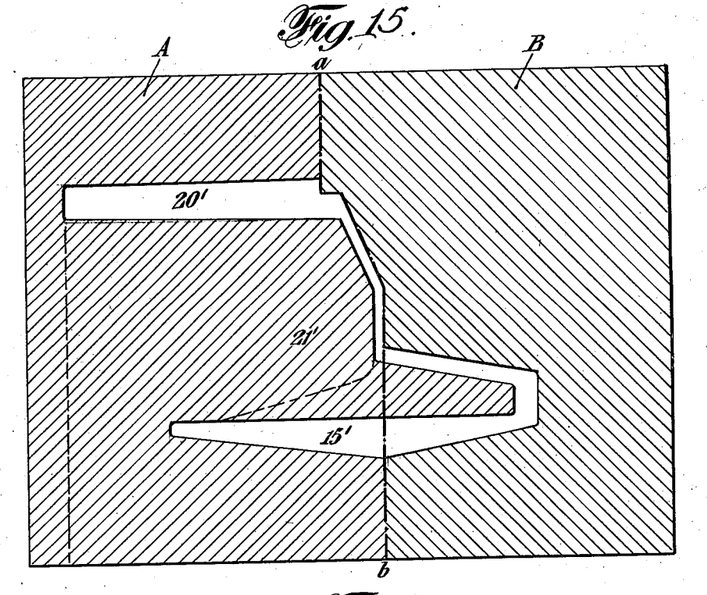
Fig. 15 is a section through the mold for making the casting shown in Fig. 1, said section being taken in radial, longitudinal plane between adjacent spokes.
Figure 16:
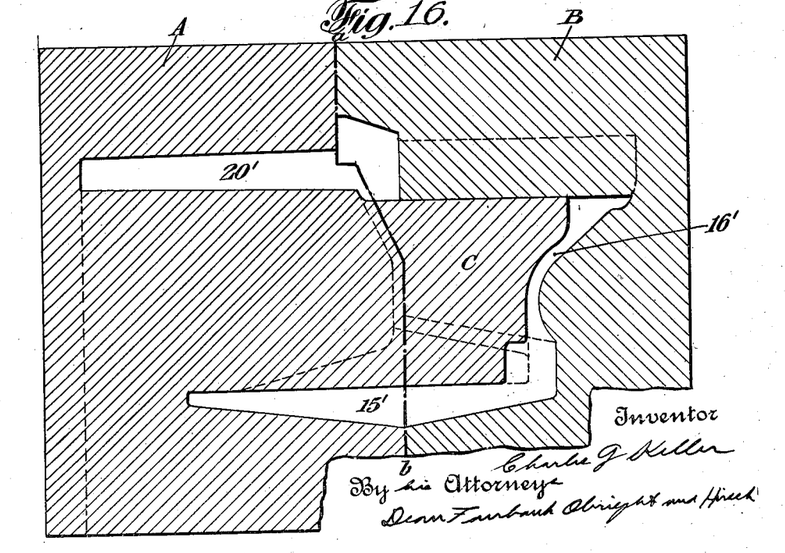
Fig. 16 is a similar section of the same mold taken in the medial plane of one of the spokes.
Figure 17:
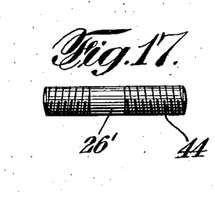
Figs. 17 and 18 are side elevations of the parts of the clamping bolt shown in Fig. 14.
Figure 18:
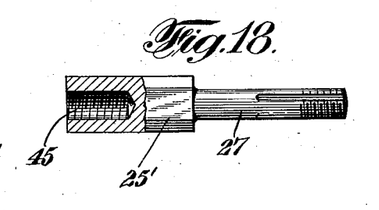

The wheel body casting is so designed that it may be made by the use of a two part green sand mold without the use of any cores. In Figs. 15 and 16, I have shown two radial, longitudinal sections through such a mold. The two sections A and B meet in a dividing plane a—b. The hub 15' extends into both sections while the web 21' lies in the surface of the section A. The brake drum 20' lies in this section while the spokes 16' are in the section B. The open side of each U-shaped spoke is toward the mold section A so that the sand of this mold section has extensions C projecting beyond the plane a—b to define the inner surface of each spoke. The various parts may be given the proper taper toward the plane a—b to facilitate withdrawal of the pattern from the mold. The casting may be machined to the form shown in Figs. 1, 2 and 3 by only a few simple operations.

For securing the tire rims to the spoke ends the outer end of head of each spoke is provided with a recess 17 approximately semi-cylindrical in form with the axis of the cylindric surface paralleling the axis of the wheel. At the hub cap side, that is the front side of the wheel the recess is open, but at the opposite or rear side it is closed by an end wall 18. The outer or peripheral surface 19 of the wall 18 is curved concentrically with the wheel and is also axially inclined from a smaller diameter at the front to a larger diameter toward the rear face of the wheel. The brake drum 20 extends rearwardly from the walls 18 of the several spokes but is of smaller diameter than the outermost edge of said wall. The webs 21 extending between each pair of spokes and at the rear end connect the edges of each U-shaped wall to those of the adjacent spokes. The spokes may be considered as large beads or corrugations on the web as well as means for attaching the rim independent of the web. The web serves to reinforce the spokes.

An opening 17' is formed in the floor of each recess 17 to provide communication with the interior of the U-shaped spoke and thence with the interior of the brake drum.

In Fig. 4 I have shown a pair of tire rims of a type known to the trade as "Firestone" rims, mounted upon the body of the wheel. A rim of this type is formed with lugs 22 each of which has an inclined inner face and a substantially radial projection at the innermost part of said face, the projection being formed with an aperture 23. The angle of the incline of the face 19 on each spoke end is approximately the same as that of the inner surface of the lug 22 so that one tire rim may be placed on the wheel with the inclined surfaces in engagement and the projections of the lugs near the inner end of the recess 17.

Figure 5:
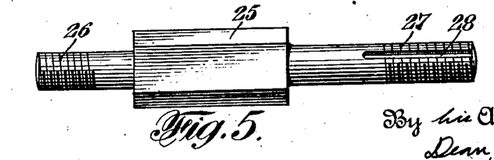
Figs. 5 and 6 are side and end views respectively of the fastening bolt shown in Fig. 4.
Figure 6:
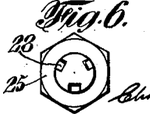

With the inner tire rim in place it is rigidly clamped by means of bolts which pass through the apertures 23 and enter threaded openings 24 in the walls 18. Each bolt of the type shown in Figs. 4, 5 and 6 has a central body portion 25, from opposite ends of which project threaded shanks 26 and 27 respectively. The body 25 may be hexagonal in cross-section or of any other out-of-round form to provide a hold for a tool by which the bolt may be screwed into or out of the opening 24. The end of the body 25 forms a shoulder to clamp the lug 22 on the inclined surface 19 of the spoke. All of the bolts may be tightened to rigidly hold the first rim, before the second rim is applied.

Figure 7:
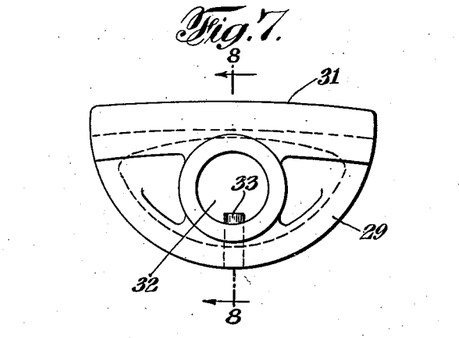
Fig. 7 is a face view of a lug used in fastening the outer rim on a dual tire wheel.
Figure 8:
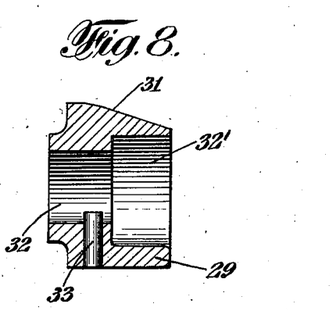
Fig. 8 is a section on line 8—8 of Fig. 7.

The second tire rim is then applied to the wheel, but with its position reversed with respect to that of the first rim. The lugs 22 are moved into the outer ends of the recesses 17 and the shanks 27 are passed through the apertures 23 in the lugs 22 until the lugs bear against the shoulders which form the outer ends of the several bolt bodies 25. The outer tire rim is then clamped in place by means of lugs or collars 29 (see Figs. 7 and 8) and nuts 30 threaded upon the shanks 27. Each lug or collar 29 has a substantially semi-cylindrical surface adapted to fit the semi-cylindrical recess 17. The outer surface 31 is arcuate concentric with the wheel and axially inclined in a direction which is the reverse of the taper or inclination of the surface 19 of the spoke end, so that it will fit snugly against the inclined face of the lugs 22 of the outer rim. Each lug 29 is formed with an aperture 32 to receive the shank 27, and by screwing a nut 30 upon the shank 27, the lug 29 is forced firmly against the inclined surface of outer rim lug 22, thereby pushing the projection of lug 22 up against the shoulder of the bolt body 25, to clamp the outer tire rim to the wheel.

The engaging surfaces of the recess 17 and lugs or collars 29 extend through a little over 180° so that the lugs cannot move radially out of the recesses and are guided in and out axially. The tire rims are spaced by the bolts and the spacing is determined by the distance between the shoulders at the ends of the body portion 25.

In order to permit the release of the lugs or collar 29 and the removal of the outer tire rim without liability of loosening the inner rim, I prevent the unscrewing of the bolts from the inner wall 18 while the lugs 29 are in place. I accomplish this by locking the bolts from turning while the nuts 30 are being unscrewed. I provide a pin 33 projecting into the aperture 32 of the lug so as to engage in a groove 28 in the shank 27. Preferably there are a plurality of the grooves 28 so that upon tightening the bolt, the latter may be left in any one of several positions and rigid holding of the first or inner rim insured. It will be understood that in applying the lugs 29 to the wheel, if one of the splines 28 does not lie in position to register with the pin 33 in the lug, the bolt may be backed off or tightened only slightly until such registry is effected. As the aperture 32 of each lug 29 is off center and is not concentric with the main outer surface of the lug and as the lug engages the rim, it cannot be turned on or with the bolt.

In Fig. 9 I have shown my improved wheel provided with a pair of rims of the type known to the trade as "Goodyear" rims. This type of rim is provided with an inclined surface portion 34 on an annular bead. As an important feature of my wheel, I make the inclination of the surfaces 19 and 31 about 16½° to the wheel axis so that it will be approximately the same as the inclined surfaces on both the Firestone and Goodyear rims, one of which is about 15° and the other 18°. It is therefore possible to apply either type rims to my wheel without any change in the construction of the wheel. It is merely necessary to use a slightly different form of clamping bolt. For the Goodyear rim, I use a bolt such as shown in Figs. 10 and 11. This consists of a body portion 35 provided with end flanges or shoulders 36 and 36', a short threaded shank 37 adapted to be screwed into the threaded hole 24 in the wall 18, and a shank 39. The latter is provided with spline grooves 40.

Instead of having the body portion made hexagonal for engagement of a wrench or other tool I may provide a hexagonal head 38 beyond the shoulder so that the bolt may be turned from the outer end.

The "Goodyear" tire rims are mounted upon and secured to the wheel in exactly the same way as are the "Firestone" rims, except that the bolt is turned until the shoulder 36 bears against the end of the bead bearing the inclined surface 34, of the inner rim instead of against a lug. The outer rim is clamped in place by means of nut 30 and lug 29, with the lug or collar 29 forcing the edge of the bead bearing the inclined surface 34 against the shoulder 36'. The distance between the shoulders 36 and 36' is therefore greater than between the shoulders at the ends of the body 25 shown in Fig. 5.

It will be noted from Fig. 9 that the shoulder 36' has but slight clearance with the wall of the recess 17. Therefore the engagement of these two parts resists bending strains on the bolts 35.

It will be noted that the lugs 29 have chambers 32' which receive the hexagonal heads 38 if the latter be present on the bolts as shown in Figs. 9 and 10.

The repeated insertion and removal of the bolts in the holes 24 formed directly in the casting might in time cause the threads in the holes to wear, or in some cases these threads might become mutilated. To avoid this I may make the bolt of two pieces as shown in Figs. 14, 17, 18 and 19. The shank piece 26' may be screwed into the hole 24 and tightened so as to remain permanently in place and present a thread end or stud 44 on which may be screwed the body 25' or 35' to lock the rim in place by reason of a threaded hole 45 in the latter. In case the thread of the stud 26' become mutilated or worn, the stud may be removed and replaced by a new one.

Figures 19, 20:
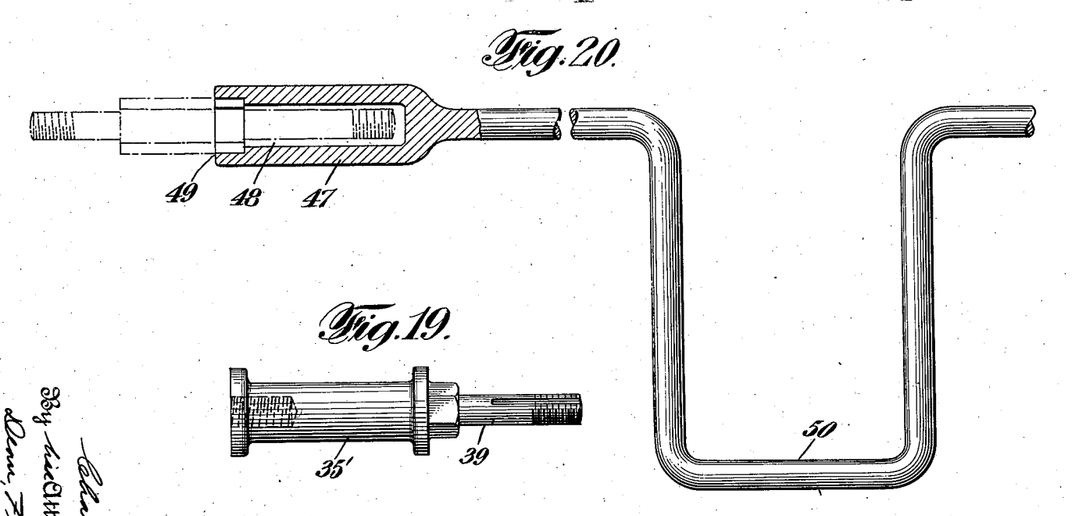
Fig. 19 is a side elevation of an alternative form of the bolt part shown in Fig. 18.
Fig. 20 is a side elevation of a tool for operating any of the bolts illustrated and the nuts used in connection therewith.

The bolts and nuts may of course be tightened or loosened by an ordinary wrench but preferably I provide a tool for this purpose such as shown in Fig. 20. This has a head 47 with a socket 48 of such depth that it may receive the shank 27 or 39 and the end part 49 of the socket may engage the hexagonal body 25 or hexagonal head 38, with which it corresponds in shape and size. This same socket part 49 may engage the nuts 30 to tighten or loosen the latter. The balance of the tool may be made in any suitable manner to provide a handle 50. The inner surface of the brake drum may be lined with a metallic coating or liner to resist wear or scoring of the drum, if so desired. This may be accomplished by chilling the surface in casting it, or by a plating process with a material that is hard, such as chromilite, or by heat treating to give the desired surface, or assembling a hard metallic band or ring in or on the drum.

The wheel casting shown in Figs. 1, 2, 4 and 9 may have the hub part made to fit any form of axle with which the wheel is to be used. Certain variations in the type of axle used, may require different construction and machining of the hub part of the casting.

Figure 14:
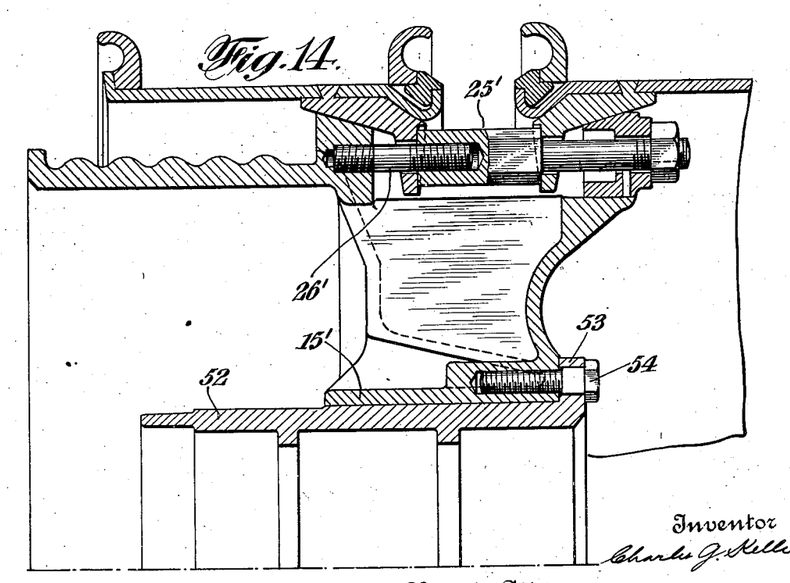
Fig. 14 is a view similar to Fig. 4 but showing a different form of clamping bolt.

By means of an adapter I may use a single wheel casting with a wide variety of axle sizes and designs. In Fig. 14 I have shown the casting with a hub 15' larger than the largest standard type of axle. With this may be used the appropriate one of a series of adapters or sleeves 52. All such adapters may have the outer surface adapted to fit snugly within the hub 15' and may be bolted or otherwise fastened in place as for instance by a flange 53 and series of bolts 54. The length, inside diameter and general design of the adapter may be made in accordance with the character of the axle with which it is to be used. By the term "hub" as used in the claims, I mean either such a complete hub as shown in Fig. 4 or the hub of the casting such as 15' in Fig. 14.

My wheels having integral brake drums are particularly adapted for use in heavy service, as one of the difficulties theretofore experienced in such service has been the development of a high degree of heat when the brakes are applied for a prolonged period, such for instance, as in traveling down a long steep hill or frequent traffic stops in city travel. Any heat so developed and conducted to the tires, directly over the brake drum, deteriorates the tire very rapidly.

By my improved construction this danger is materially reduced, if not entirely eliminated, because the drums or braking surfaces are an integral part of the wheel and the heat is therefore distributed throughout the whole wheel and dissipated by reason of a large radiating surface and volume of metal afforded by the wheel and brake drum construction. Furthermore, the openings 17' in the ends of the spokes allow for the circulation of air by centrifugal action, discharging between the twin tires, to dissipate heat from the wheels and from the tires as well.

To further prevent undue heating of the inner rim and tire by radiation from the brake drum, I provide for circulation of air between the rim and the drum. This may be effected by fitting arcuate shields 41 (see Fig. 12) between each pair of spokes. These shields are secured to the ends of the spokes by screws or other fastening means 42. Air circulation created centrifugally by and between the spokes will strike the shields 41 and be deflected under the tire rims and particularly the inner one, thereby providing a circulation that will prevent direct convection or absorption of heat from the brake drum to the inner rim. If necessary one of the shields 41 may be provided with a groove 43, as indicated in Fig. 13, to receive the valve stem of the tire on the inner rim.

Although the shields are shown as being detachably secured to the spokes, they may be cast integral with the spokes if desired.

In Fig. 4 I have shown the outer surface of the drum 20 corrugated to increase the heat radiating surface. I may make the brake drum 21' with its outer surface tapering as shown in Fig. 9 so as to aid the air circulation. By means of the chimney action combined with centrifugal action, as the air travels along the outer tapering or inclined surface of the drum, I increase the velocity as it nears the outer larger edge of the drum.

The chimney or draft is caused by the hot air cooling or decreasing in volume. The hot air enters the pocket or space between the outer end outside diameter of the brake drum and inner rim diameter and passes out thru the smaller area passage between the inner end outside diameter of the brake drum and inside diameter of the rim. To aid this air circulation or draft the brake drum outer diameter is tapered so as to effect a centrifugal action, allowing the air to move at an increased velocity along the tapered or inclined surface.

I have hereinbefore pointed out that one important feature of my wheel is its adaptability to take either the "Goodyear" or "Firestone" rim. This feature may be embodied in a wheel with or without a brake drum and might be used in a wheel having a felly. Each rim seat is inclined at approximately 16½° to the axis. This angle is the mean between the extreme angles of the rims which may be used.

In the "Goodyear" rim the body portion is split transversely along a diagonal line. In assembling, it is preferable that this split comes directly at the end of the spoke so that the split ends will be supported by the spoke. The positioning of the rim may be insured by a pair of projections thereon which will engage with opposite sides of the spoke at the opposite sides of a space between spokes.

Another important advantage of my improved construction is that it permits the use of a single wheel to support tire rims not only of different constructions, but also of different spacings. From a consideration of Figs. 4 and 9 it will be seen that the inner rim, that is, the one over the brake drum and shown at the left hand side, has a fixed position in respect to the body of the wheel, because it is supported directly by said body. The rim of the outer or right hand tire is supported by the lugs or collars 29. The spacing bolts may be made with any desired distance between the two shoulders thereof. Therefore the bolts will hold the inner rim in a fixed position but will permit the outer rim to be as close to or as far from the inner rim as desired, in accordance with the length of the body portion of the spacing bolts. In connection with the spacing bolts of any particular length, there would preferably be employed a corresponding series of lugs 29. The particular lug 29 used with any particular spacing bolt should be such that when the outer rim is forced against the shoulder of the spacing bolt by means of the inclined surface 31, the outer end of the lug will come substantially flush with the outer surface of the spoke. Thus the shorter the body portion of a bolt, the longer would be the overall dimension of the lug 29. The variable spacing of the tires is important as it permits the use of balloon, oversized, or standard tires, while maintaining substantially constant the width of the air passage between the tires and the use of but one wheel design.

Having thus described my invention, what I claim is:

1. A fellyless vehicle wheel comprising a hub, spokes integral with a hub, and a brake drum integral with the spokes, the outer end of each spoke being formed with means for attaching a rim thereto, each spoke being U-shaped in cross-section open toward and within the brake drum and having also an opening in the outer end thereof.

2. A fellyless wheel formed of a single integral casting including a hub, a plurality of spokes U-shaped in cross section and open at their outer and inner ends, and a web between and integral with said spokes and including a portion extending approximately radially and connecting the edges of the U of each spoke with those of the adjacent spokes and a portion extending approximately axially at the inner end of the spokes, whereby air between said last mentioned portion and said hub may flow radially of the wheel through each spoke.

3. A fellyless wheel formed of a single integral casting including a hub, a plurality of spokes U-shaped in cross section, a web between and integral with said spokes and including a portion extending approximately radially and connecting the edges of the U of each spoke with those of the adjacent spokes and a portion extending approximately axially at the inner ends of the spokes, and a brake drum integral with said web at the outer edge of the latter and extending outward axially from the free edges of said spokes.

4. A fellyless wheel including a hub, a web cast integral therewith and having an inner portion extending approximately in an axial direction, and an outer portion extending approximately in a radial direction, a brake drum integral with said web at the outer edge of the latter portion and extending axially, said spokes being open at their inner ends inside of said drum so as to leave air passages past the inner edge of the drum and means at the outer edge of the web beyond said drum for supporting a tire, spaced from said drum to form an air passage therebetween.

5. A vehicle wheel formed of a single integral casting and comprising a hub, a plurality of spokes each formed at its outer end with means for attaching a rim thereto and a brake drum connecting the spokes, each spoke being U-shaped in cross-section and said brake drum being spaced from the outer ends of the spokes so as to leave axially extending air circulating passages between the spokes, said spokes being open at their inner ends inside of said drum so a to leave radially extending air circulating pasasges in the spokes past the inner edge of the drum.

6. A vehicle wheel formed of a single integral casting and comprising a hub, a plurality of spokes each formed at the outer end with a rim seat, and a brake drum, the spokes being formed with channels open at their outer and inner ends and adapted to conduct air from the interior of the drum and deliver it through the ends of the spokes.

7. A vehicle wheel adapted to support a pair of rims and comprising a hub, a plurality of spokes, a drum connected to the spokes, the spokes being formed with channels to carry off air centrifugally from the drum and out between the rims and tires, and a deflector between each pair of spokes adapted to deflect air axially between the brake drum and one rim.

8. A vehicle wheel having a series of spokes, means at the outer end thereof for attaching thereto a pair of rims and detachable baffles secured to said spokes at the outer ends of the latter for deflecting axially the air current induced by centrifugal force between the spokes.

9. A vehicle wheel having a plurality of spokes substantially U-shaped in cross-section, a web disposed between adjacent spokes and integral therewith, said web including a portion extending substantially axially at the inner ends of the spokes and a portion extending approximately radially and connecting the free edges of each spoke to those of the adjacent spokes, the radial passages within said spokes being open at their inner and outer ends, and means for supporting a pair of rims on the outer ends of said spokes, said rims being spaced apart to form passages communicating with the passages in said spokes.

10. A fellyless vehicle wheel, including a plurality of spokes spaced apart, each of said spokes having an air passage lengthwise therethrough, and the spokes forming separate radial air passages, and a brake drum secured to said spokes adjacent to their outer ends, said spokes serving to support a pair of axially spaced rims, one of said rims encircling and spaced from said brake drum, the passages through said spokes being open at their inner ends inside of the brake drum and open at their outer ends for delivering air radially between said rims, and the passages between said spokes being open at their inner ends on the side of the wheel opposite to the brake drum and communicating at their outer ends with the space between said brake drum and the encircling rim, but closed against passage of air therefrom radially between said rims.

11. A vehicle wheel having a plurality of spokes forming a set of air passages therethrough and a set of air passages therebetween, a pair of rims secured to the outer ends of said spokes, a brake drum secured to said spokes adjacent to their outer ends, and means for externally and internally cooling said brake drum including means for directing air from the passages between the spokes axially across the outer surface of the brake drum, the passages through said spokes opening within the drum at their inner ends and radially between said rims on their outer ends.

12. A fellyless vehicle wheel, including a hub, a plurality of spokes radiating therefrom, a pair of rims, and means on the outer ends of said spokes for securing said rims to said spokes in axially spaced positions, said spokes having air passages therein and therebetween, the passages within said spokes being open at the radially outer ends and the inboard side and communicating at their outer ends with the space between said rims, and the space between said rims being closed between adjacent spokes.

13. A fellyless vehicle wheel formed of a single casting, including a hub, a plurality of spokes adapted to support a pair of rims in axially spaced positions, a brake drum, and webs between the spokes, but spaced from the rims to leave air passages therebetween, said spokes having passages lengthwise thereof open at the inboard side within the drum to permit entrance of air to said spoke passages and open at the radially outer end and in communication with the space between said rims for the escape of air radially between the rims.

14. A fellyless vehicle wheel having a series of spokes substantially U-shaped in cross section to form air passages therein and air passages therebetween, means for supporting a pair of rims spaced apart axially on the outer ends of said spokes, the space between said rims and between said spokes being closed whereby the currents of air induced between the spokes by centrifugal force are deflected axially beneath said rims, and the space between said rims and opposite to the ends of said spokes being open whereby the air currents induced within said spokes by centrifugal force may flow outward radially between the rims.

15. A fellyless vehicle wheel having a series of spokes substantially U-shaped in cross-section, means for supporting a pair of rims in axially spaced relationship on the outer ends of said spokes, a brake drum carried by said spokes, said spokes being open at their outer ends for directing out between said rims the current of air induced in the spokes by centrifugal force, and a removable baffle for deflecting axially beneath said rims the air current induced between said spokes by centrifugal force.

16. A vehicle wheel having spokes formed with air passages therein and air passages therebetween, means for supporting a pair of rims on the outer ends of said spokes in axially spaced relationship, the passages between the spokes being closed at their outer ends and the passages within the spokes being open at their outer ends and communicating with the space between said rims.

Signed at New York, in the county of New York and State of New York this 1st day of December, A. D. 1926.

CHARLES G. KELLER.